United States Patent
Diener et al.

(10) Patent No.: US 9,509,786 B2
(45) Date of Patent: Nov. 29, 2016

(54) ENABLING MOBILE APPLICATIONS TO ACQUIRE A MAC ADDRESS FOR OBTAINING LOCATION INFORMATION

(71) Applicant: Cisco Technology, Inc., San Jose, CA (US)

(72) Inventors: Neil R. Diener, Hudson, OH (US); Jagdish Girimaji, Pleasanton, CA (US); Rad Sethuraman, Campbell, CA (US); Balachander Chandrasekaran, San Ramon, CA (US); Ravi Akireddy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/877,989

(22) Filed: Oct. 8, 2015

(65) Prior Publication Data

US 2016/0028837 A1 Jan. 28, 2016

Related U.S. Application Data

(63) Continuation of application No. 14/028,874, filed on Sep. 17, 2013, now Pat. No. 9,225,681.

(51) Int. Cl.
*H04L 29/08* (2006.01)
*H04L 29/12* (2006.01)
*H04L 29/06* (2006.01)
*H04W 4/02* (2009.01)

(52) U.S. Cl.
CPC ............ *H04L 67/18* (2013.01); *H04L 61/609* (2013.01); *H04L 61/6022* (2013.01); *H04L 69/22* (2013.01); *H04L 67/146* (2013.01); *H04W 4/02* (2013.01)

(58) Field of Classification Search
None
See application file for complete search history.

(56) References Cited

U.S. PATENT DOCUMENTS

2002/0055924 A1   5/2002 Liming
2003/0202536 A1  10/2003 Foster et al.
2008/0114539 A1   5/2008 Lim
2010/0106774 A1*  4/2010 Thomson ............ H04L 65/1063
                                                       709/203
2011/0173674 A1   7/2011 Thomson et al.
2014/0250164 A1*  9/2014 Marx .................... H04L 67/18
                                                       709/203
2015/0032905 A1   1/2015 Celebi et al.
2015/0078402 A1   3/2015 Diener et al.

FOREIGN PATENT DOCUMENTS

AU        2011201767 A1    5/2011

OTHER PUBLICATIONS

Popescu, "Geolocation API Specification," W3C Working Draft, Geolocation Working Group, Jul. 7, 2009, retrieved from http://www.w3.org/TR/2009/WD-geolocation-API-20090707/, pp. 1-8.
Merge Design, "HTML 5 Geolocation with Safari on the iPhone 3.0 OS," Jul. 6, 2009, retrieved from http://web.archive.org/web/20090706053330/http://merged.ca/iphone/html5-geolocation, 1 page.
Gruteser et al., "Enhancing Location Privacy in Wireless LAN Through Disposable Interface Identifiers: A Quantitative Analysis", WMASH, Proceedings of the ACM International Workshop on Wireless Mobile Applications and Services, Sep. 19, 2003, pp. 46-55.
International Search Report and Written Opinion in counterpart International Application No. PCT/US2014/055550, mailed Dec. 8, 2014, 10 pages.

* cited by examiner

*Primary Examiner* — Faruk Hamza
*Assistant Examiner* — Cassandra Decker
(74) *Attorney, Agent, or Firm* — Edell, Shapiro & Finnan, LLC

(57) ABSTRACT

Techniques are presented to enable a network element in a network to receive a request from an application on a device, the request being encapsulated in a packet that includes a header that contains a physical layer identifier of the device to which the application does not have access. The physical layer identifier at the network element may be obtained. A response may be sent to the application on the device, the response containing at least one of the physical layer identifier of the device and location information of the device.

15 Claims, 9 Drawing Sheets

United States Patent US 9,509,786 B2

ENABLING MOBILE APPLICATIONS TO ACQUIRE A MAC ADDRESS FOR OBTAINING LOCATION INFORMATION

CROSS REFERENCE TO RELATED APPLICATIONS

This application is a continuation of U.S. patent application Ser. No. 14/028,874, filed Sep. 17, 2013, entitled "Enabling Mobile Applications to Acquire a MAC Address for Obtaining Location Information," the entire contents of which are hereby incorporated by reference in their entirety.

TECHNICAL FIELD

The present disclosure relates to device location acquisition via a network.

BACKGROUND

Radio signals may be used to determine the location of a device in a wireless network, such as a Wi-Fi™ network. For example, the location of a user device may be triangulated based upon wireless signal strength and other indicators detected at nearby Wi-Fi access points (APs). Wi-Fi location tracking can be especially useful indoors, where Global Positioning System (GPS) signals may be unavailable.

The media access control (MAC) address of a user device may be used as an identifier on the network for location tracking. This can be a problem for applications executing on user devices, which, for security and other reasons, are increasingly prohibited from querying the device operating system to obtain a MAC address of the device. The prohibition may apply to applications executing within a user web browser, or to applications directly installed on the user device. The result is that user device applications cannot utilize location tracking services.

DESCRIPTION OF EXAMPLE EMBODIMENTS

Overview

Techniques are presented to enable a network element in a network to receive a request from an application on a device, the request being encapsulated in a packet that includes a header that contains a physical layer identifier of the device to which the application does not have access. The physical layer identifier at the network element is obtained. A response is sent to the application on the device, the response containing at least one of the physical layer identifier of the device and location information of the device.

Example Embodiments

Figure 1:
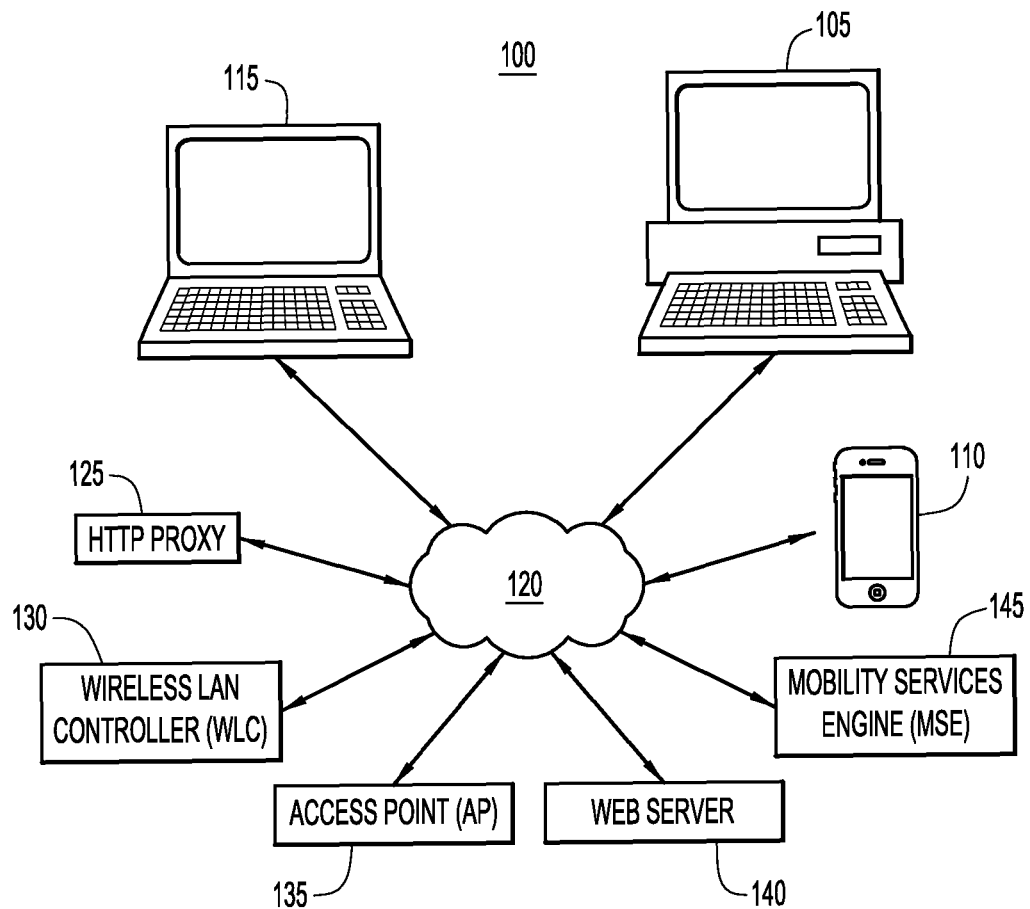
FIG. 1 is a high level block diagram of a system in which applications on a device may be configured to gain access, either directly or indirectly, to a physical layer identifier, (e.g., the MAC address) or other identifier of the device.

Referring first to FIG. 1, a location look-up system 100 is shown. The system 100 may include user devices 105, 110 and 115 which may communicate via network 120 with network elements 125, 130, 135, 140 and 145. The user devices may take any of a variety of forms, including a desktop computer, laptop computer, mobile/cellular phone (e.g., Smartphone), tablet computer, etc. The user devices may connect to network 120 to communicate with each other and with other network elements. The network 120 may consist of one or more wired and/or wireless local and/or wide area networks. Other network elements that may be utilized according to techniques presented herein include one or more Hypertext Transport Protocol (HTTP) proxies 125, one or more wireless local area network (LAN) controllers (WLC) 130, one or more access points (APs) 135, one or more web servers 140, and one or more Mobility Service Engine (MSE) servers 145. These network elements may perform the services of other network elements for the techniques presented herein. For example, an access point may perform the functions of a proxy device 125, a controller 130 may perform the functions of a location server such as the MSE server 145, etc.

A proxy server, such as an HTTP proxy 125, is a server that acts as an intermediary for requests from clients seeking resources from other servers, such as a web server 140. Proxies are widely used to facilitate access to content on the World Wide Web, and may be used to filter, cache, translate, log, and anonymously access data. Proxies may also be used to add content to data passing through them. For example, a web proxy or HTTP proxy may "inject" additional content to a web page. This may include injecting a cookie or a Hypertext Markup Language (HTML) border with business or local information into a web page. A business venue may use a proxy to offer their customers a customized presentation or location-relevant data to the web content accessed by their clients.

The AP 135 is a wireless device that allows another device to wirelessly connect to network resources using the IEEE 802.11 or Wi-Fi™ communication, or other standards. APs may be managed by a controller 130, where a controller may automatically configure up to thousands of access points.

The MSE server 145 may provide network analytics, location-based mobile services, and enhanced wireless network security. The MSE server 145 may also act as a location server, coordinating with access points to triangulate the locations of user devices based on indicators such as signal strength. The location server functionality is useful indoors where GPS services may be unavailable, and allows user devices to utilize rich location-based features, such as turn-by-turn directions, and location-relevant advertisements.

Figure 2:
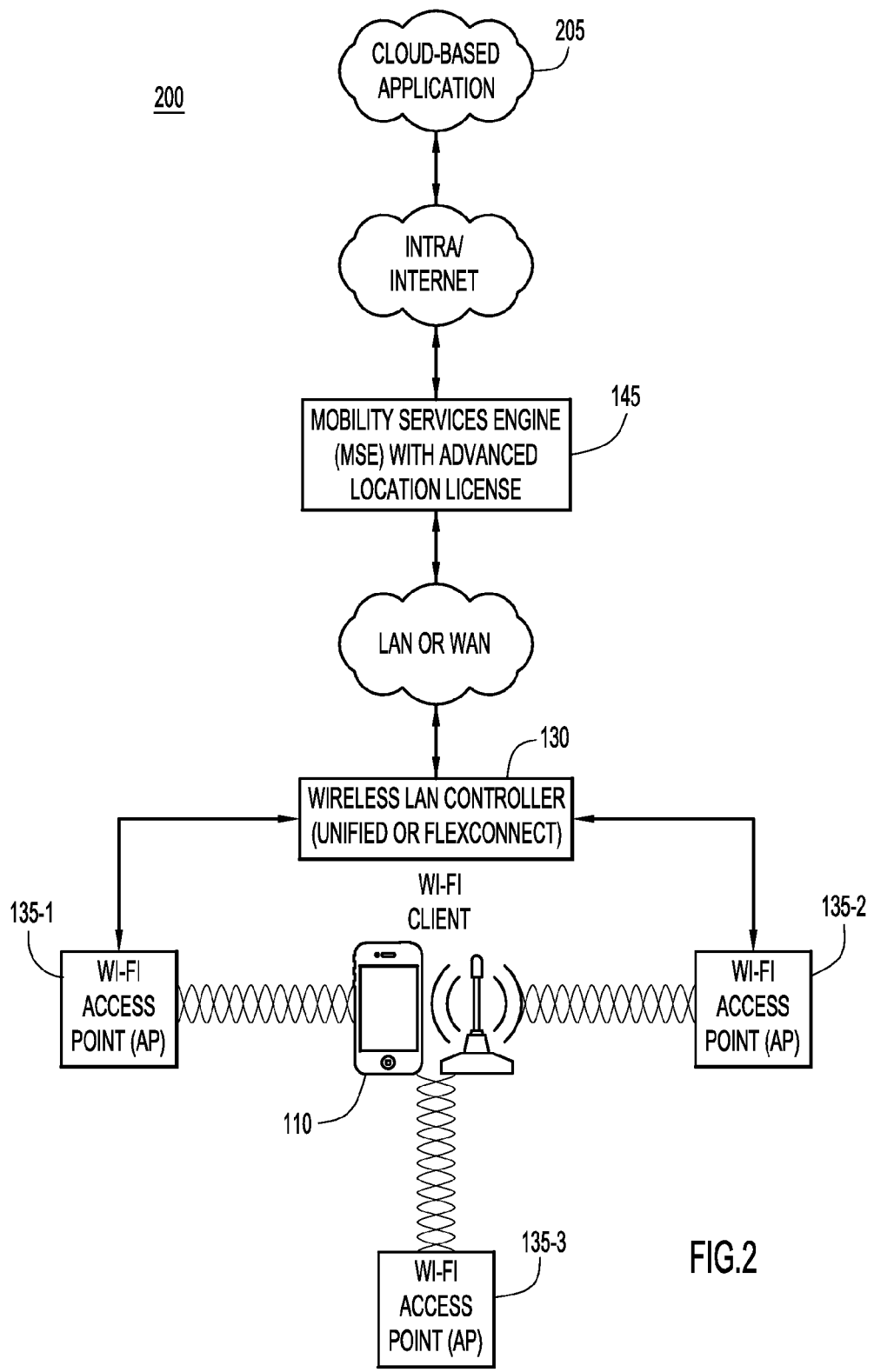
FIG. 2 is an example of a more detailed block diagram of a location look-up system in which applications on a device may be configured to gain access, either directly or indirectly, to the MAC address or other identifier of the device.

Reference is now made to FIG. 2. FIG. 2 shows a more detailed block diagram for an example network setup or system 200. In the system 200, a wireless user device 110 may communicate via access points 135-1, 135-2 and 135-3 to other network elements. Signals from a wireless user device 110 may be received by access points 135-1, 135-2 and 135-3, or signals from the access points 135-1, 135-2 and 135-3 are received at the user device 110, in order to determine the device location. The access points may be configured and managed by controller 130, and raw signal information may be provided to MSE server 145, which may perform further calculations to determine the location of the wireless user device 110, and may store the location information. The access points 135-1, 135-2 and 135-3, controller 130, and MSE server 145 may together or individually provide the user device access to the World Wide Web, and communicate with a cloud-based application 205 that may exist on the Internet, or Intranet, etc. The user device 110 may also have "native" or installed applications which can send and receive data on the LAN, WAN, Internet, or Intranet, etc.

A MAC address is a unique physical layer identifier assigned to network interfaces for communications on a physical network segment. The MAC address may thus uniquely associate a given user device with associated location information on the MSE or other network element acting as a location server. However, increasingly, operating systems restrict user application access to the MAC address of a device. As a result, web-based or cloud-based applications, and even native applications running on the device, may not be able to acquire location information that is associated with the MAC address or other unique identifier of device. Yet, requests and other messages sent from a device on the network contain content from an application that is encapsulated in a packet having one or more headers containing the MAC address of the device, Internet Protocol (IP) address used by the device, and other device or network identifiers. Thus, packets generated by the network stack in the device from content provided by an application may contain the physical layer identifier (e.g., MAC address) to which the application does not have access due to restrictions imposed by the operating system of the device. Nevertheless, various network elements in the path of communications to/from the device may have access to the MAC address or other unique identifiers in the headers of packets originating from that device. While a physical layer identifier is referred to herein as a means to obtain location information for a device, other unique identifiers may be used with techniques presented herein, including an IP address. In addition to the MAC address, other physical layer identifiers (now known or hereinafter developed) may also be used with the techniques presented herein.

Figure 3:
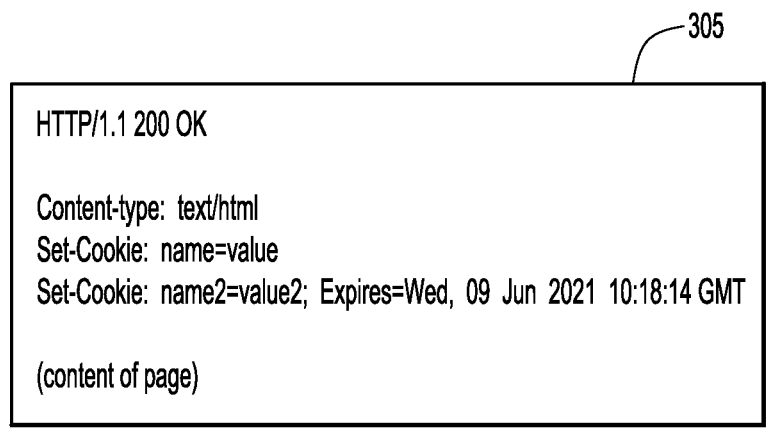
FIG. 3 is a diagram that depicts a web cookie that may be used to provide a user device with a MAC address, other identifier, or location coordinates of the user device.

One solution presented herein utilizes web cookies. A web cookie, or HTTP cookie, or simply cookie, is data received from an external source that is typically stored in a web browser. Examples of a web cookie are shown in FIG. 3 at 305, where a cookie variable name may be set to a value, e.g., cookie variable name2 may be set to value2, with an optional attached expiration date, etc. Web cookie values may be set by destination web servers and intermediary network elements, which may even insert data (e.g., a MAC address or other unique identifier) to which user applications would not normally have access.

Figure 4:
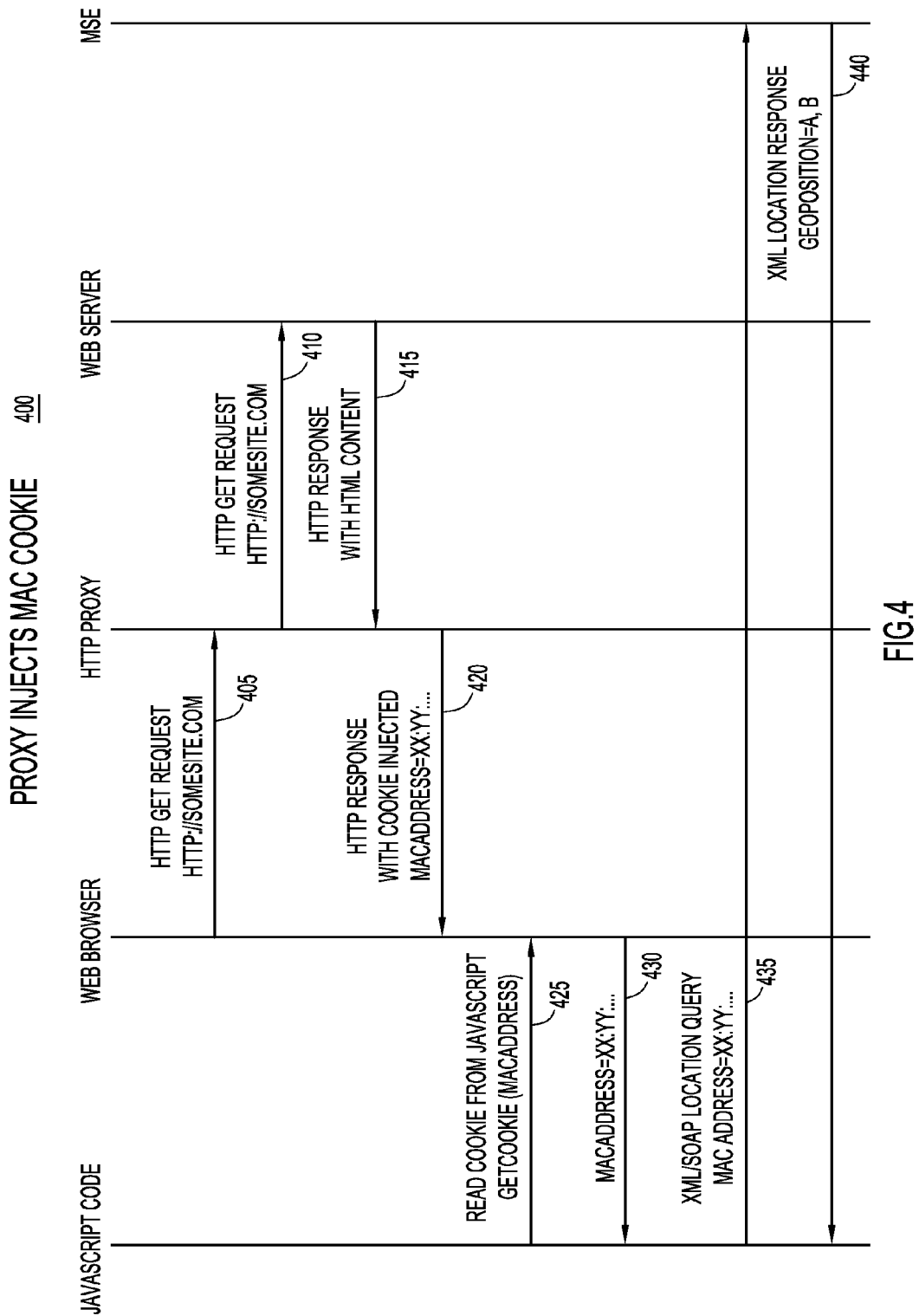
FIG. 4 is a ladder diagram depicting message flow using a proxy device to provide a web cookie containing a MAC address or other identifier to an application on a user device.

An example is shown in the ladder diagram of FIG. 4, which shows steps of a process 400 by which a user application, such as a web browser, may communicate with other network elements to obtain location information of the device using a MAC address of the device, but without the application having access to the MAC address of the device. A user device may access a web page at 405 with, for example, by an HTTP GET request (http://somesite.com), which may be intercepted by an HTTP proxy, and forwarded to a web server at 410. The web server may respond with web content at 415. The HTTP proxy may then inject a cookie with the MAC address of the user device into the web content and forward it to the user application (web browser) at 420. Such a cookie injection may be as achieved by, for example, Set-Cookie: Macaddress=3C:97:0E:6A:E7:6B. The HTTP proxy may acquire the MAC address information of the user device from the packet or frame header at 415, or from the packet or frame header at 405. In another form, the HTTP proxy may acquire an IP address and look up the associated MAC address in local storage, or pull MAC addresses from the headers of packets or frames and immediately inject them into cookies. The HTTP proxy may also obtain the IP address of the user device at steps 405, 415 or 420 from the HTTP GET request packet header, or internal storage, and query a controller or location server (e.g., MSE server) to obtain the MAC address for the user device for injection at 420. The controller or location server may maintain a table containing IP addresses on the network and associated MAC addresses.

The user application could then read the cookie with JavaScript code at 425, for example, though a variety of other programming languages could accomplish this feature. Such a command may be, for example, getCookie(Macaddress), which would return the MAC address value at 430. The JavaScript code may then create a request to a location server, e.g., the MSE server, by way of an Extensible Markup Language (XML) Simple Object Access Protocol (SOAP) location query, as shown at 435. The application programming interfaces (APIs) of the location server and other network elements may also be based on a representational state transfer (REST) model. Other API models are within the scope of techniques presented herein. The MSE may then return location coordinates at 440 as X, Y, Z coordinates, latitude and longitude, etc.

This technique may repeatedly update the cookie with a MAC address each time a user sends a request to any location or website, or may intermittently update the MAC address at a predetermined time interval, which may be set by the user or only when the user application is accessing location-based functionality. Similarly, the user application may query the location server to obtain location coordinates after each time a request is sent and MAC address received, or may check for location coordinates after predetermined time intervals, which may be set by the user, or may check for location coordinates only when the user is accessing location-based services. Any combinations of these features are envisioned.

Figure 5:
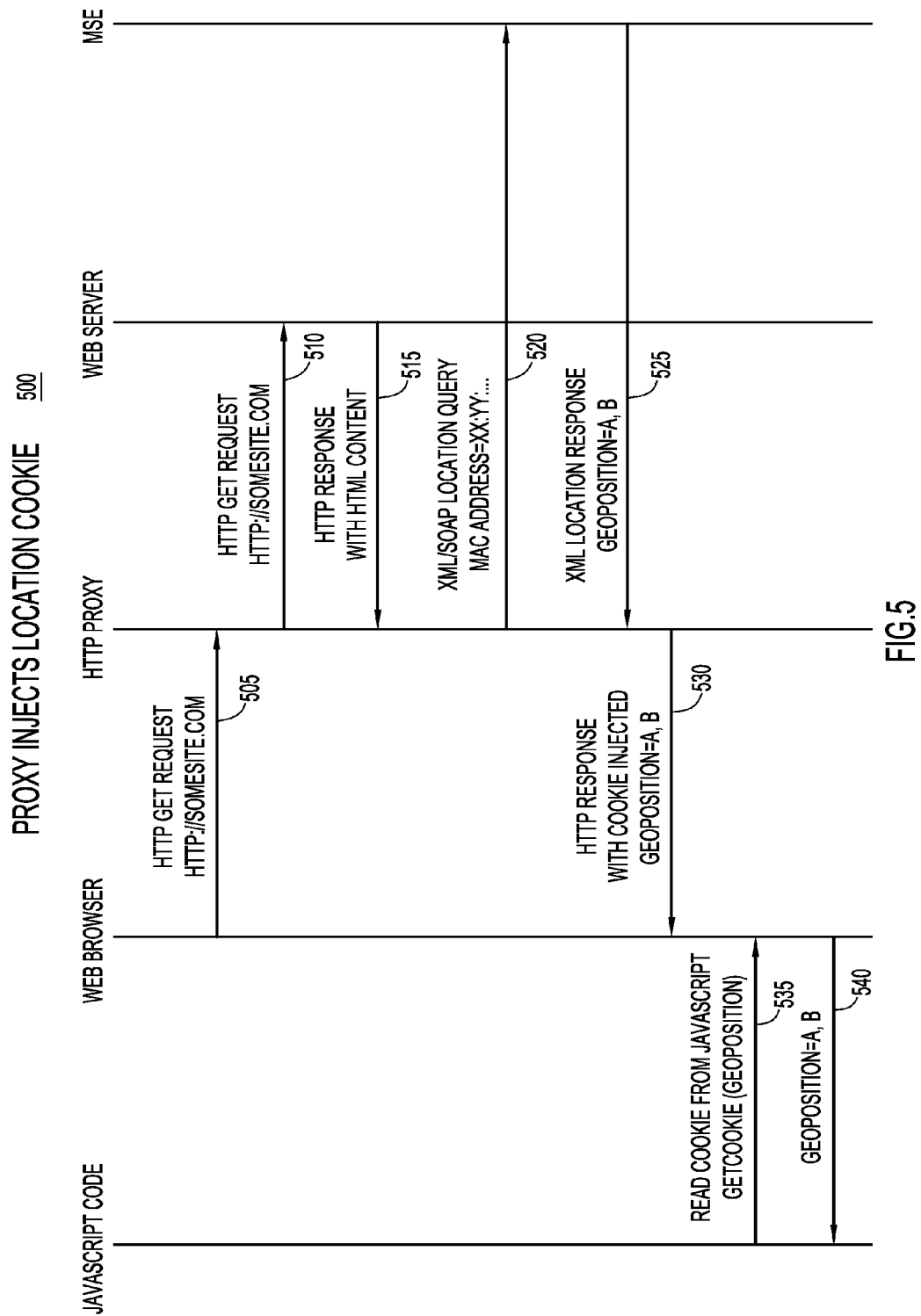
FIG. 5 is a ladder diagram depicting message flow using a proxy device to provide a web cookie containing location coordinates to an application on a user device.

Another technique is presented with reference to FIG. 5. FIG. 5 which shows steps for a process 500 by which a user application, such as a web browser, may communicate with other network elements to obtain location coordinates. In this embodiment, a user device may access a web page at 505 with, for example, an HTTP GET request, which may be intercepted by an HTTP proxy, and forwarded to a web server at 510. The web server may respond with web content at 515. The HTTP proxy may use the MAC address of the user device in an XML/SOAP location query at 520 to the MSE server to obtain location coordinates from the MSE server at 525. The HTTP proxy may obtain the MAC address from the packet header of the incoming HTTP GET request at 505, or from the HTTP response at 515 for use in the location query at 520. The HTTP proxy may also obtain the IP address of the user device at steps 505, 510 or 515, from the HTTP GET request packet header or internal storage, query a controller or location server at 520 to get the location coordinates for the user device for injection at 530. The HTTP proxy may inject the coordinates into a cookie in the web content and return it to the application at 530. The user application may then access the location coordinates using JavaScript code or other programming language at 535 and 540. Variations in the protocols and languages used, the format of the location coordinates, and frequency of insertion into HTTP requests, etc. are discussed above with respect to FIG. 4, and are applicable to the process 500.

Systems which locate users may have an opt-in feature. This may be accommodated by the HTTP proxy presenting a login page or splash page on the user device in response to an initial HTTP request. A checkbox or similar feature may be presented allowing the user to opt-out of cookie-based location updates.

In another example, the HTTP proxy or any other network element may inject a tag containing location information which may include location coordinates into the HTML body of the web page requested using HTML or other web programming languages. Code may also be injected into other portions of web content, for example JavaScript into a JavaScript portion of a webpage. Injected code may set a global variable with location information such as a MAC address or other unique identifier, which the application on the user device may access. A Document Object Model (DOM) object may also be injected to provide a MAC address or other unique identifier, other location information, or location coordinates. Injections of JavaScript, HTML, DOM objects etc. may occur, for example, at steps 420 in FIG. 4 or 530 in FIG. 5. The injected JavaScript, DOM object, or in general any injected web software code may also contain software functions which enable the user device to communicate with a location server (e.g., the MSE server) to obtain location information using the MAC address.

Figure 6:
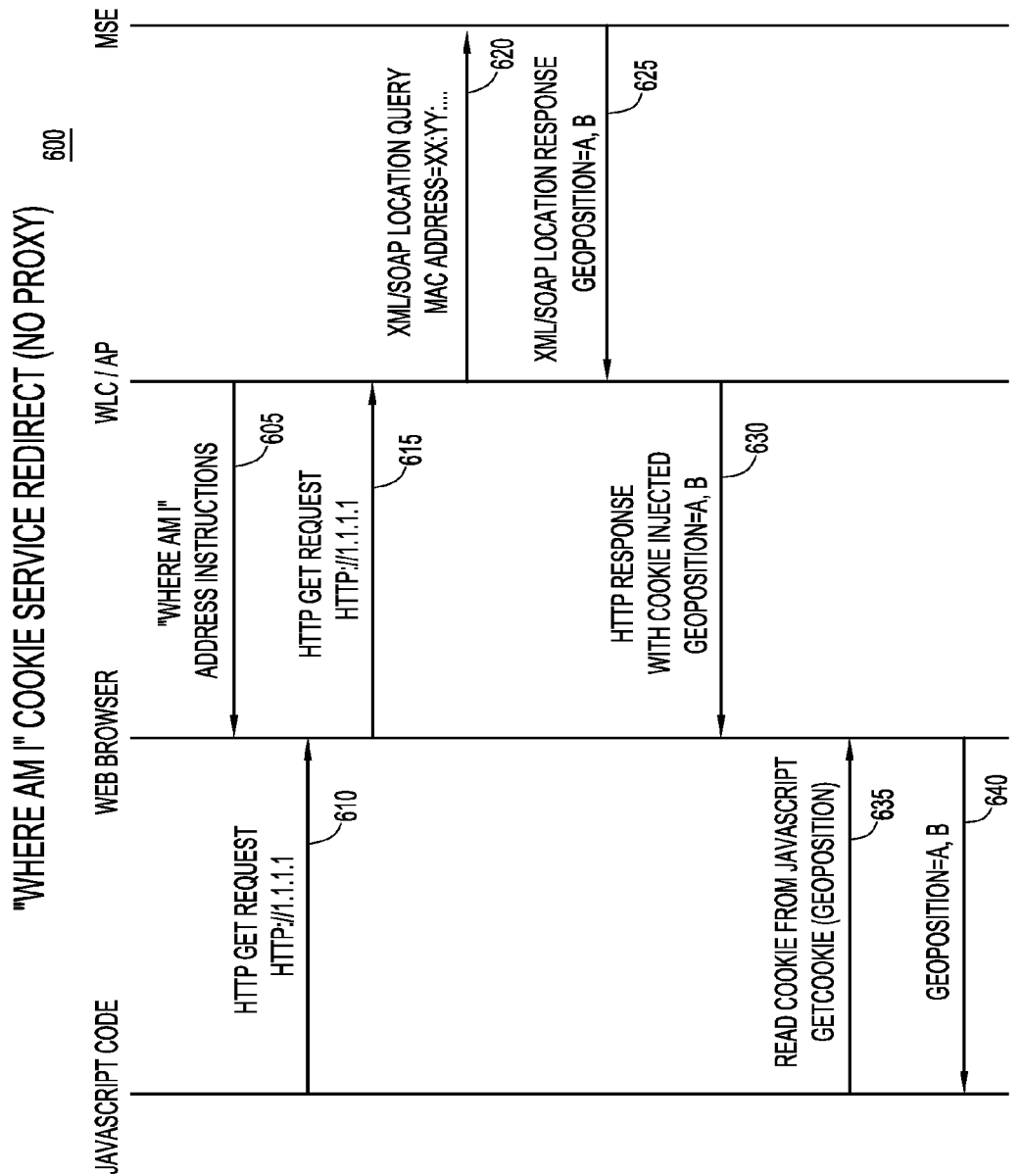
FIG. 6 is a ladder diagram depicting message flow in which a network element responds to the accessing of a predetermined address by providing a web cookie containing location coordinates to an application on a user device.

FIG. 6 shows steps for a process 600 by which a user application, such as a web browser, may communicate with other network elements to obtain location coordinates without the use of a proxy. Rather, a controller and/or an access point may first provide instructions at 605 as to how the application on the user device may query location information. This may involve providing a predetermined IP address (e.g., http://1.1.1.1) or a domain name (e.g., http://location-me.com) for the user to access in order to obtain location information of the device. The predetermined IP address or domain name may be determined by the application, a user of the user device, a network administrator, the controller or access point, etc. The instructions conveyed at 605 may also include code in, for example, JavaScript to allow the application to access location information at the predetermined domain name. The application may then initiate an HTTP GET request at 610 and 615 to the predetermined domain name, which is received by the access point and/or controller. This is similar to a redirect, since the IP address or domain name does not necessarily point to an external web server, but rather may be intercepted by the local controller or other network element, which in turn forwards the relevant identifier of the user device to the entity that has the location information about the device. The controller may have access to layer 2 information of the request packet/frame header where the MAC address is contained. The controller and/or access point may then use that MAC address in, for example, an XML/SOAP query to the location server at 620 to obtain location coordinates of the device, at 625. The access point and/or controller may then inject the coordinates into the HTTP response in a cookie at 630 to be read by at 635 and 640. Variations in the protocols and languages used, the format of the location coordinates, and frequency of HTTP requests, etc. are described above in connection with FIG. 4, and are applicable to the process 600.

The user, the application, or any network device such as the controller may specify how often the HTTP request for location information should be or will be executed. The application on the user device or a network element may perform a Domain Name System (DNS) lookup to obtain an IP address corresponding to a domain name used in steps 610 and 615. Other protocols such as Mobility Services Advertisement Protocol (MSAP) may be used to obtain the IP address. Further, the "Where Am I" service of FIG. 6 may run in the background of the application, and thus the user may be unaware of the execution of the service.

Figure 7:
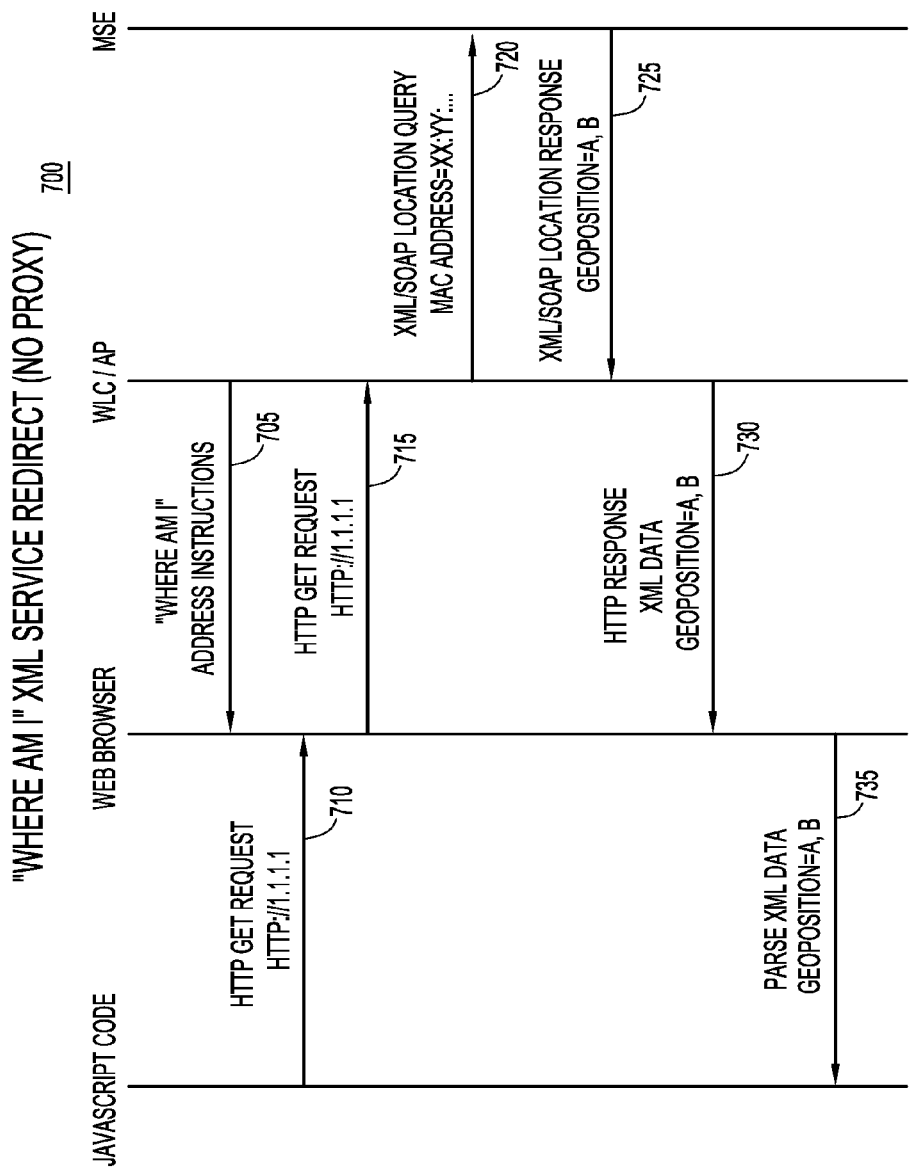
FIG. 7 is a ladder diagram depicting message flow in which a network element responds to the accessing of a predetermined address by providing structured data containing location coordinates to an application on a user device.

A variation of the proxy-free technique shown in FIG. 6 is shown in FIG. 7. FIG. 7 shows a series of steps for process 700 by which a user application, such as a web browser, may communicate with other network elements to obtain location coordinates, again, without the use of a proxy. A controller and/or an access point may first provide instructions at 705 as to how the application on the user device may query location information. This may be by providing a predetermined IP address or a domain name for the user to access. The predetermined IP address or domain name may be determined by the application, a user of the user device, a network administrator, the controller or access point, etc. The instructions conveyed at 705 may also include code in, for example, JavaScript to allow the application to access location information at the predetermined domain name. The application may then initiate an HTTP GET request at 710 and 715 to the predetermined domain name, which is received by the access point and/or controller. This is similar to a redirect, since the IP address or domain name does not necessarily point to an external web server, but rather may be intercepted by the local controller or other network element, which in turn forwards the relevant identifier of the user device to the entity that has the location information about the device. The controller may have access to layer 2 information of the request packet/frame header where the MAC address is contained. The controller and/or access point may then use that MAC address in, for example, an XML/SOAP query to the MSE server at 720 to obtain location coordinates from the MSE server at 725. The access point and/or controller may then insert the location coordinates into the HTTP response at 730 as, for example, XML data to be read by the application JavaScript at 735. The aforementioned variations described above with respect to the previous figures are also applicable to the process of FIG. 7.

Figure 8:
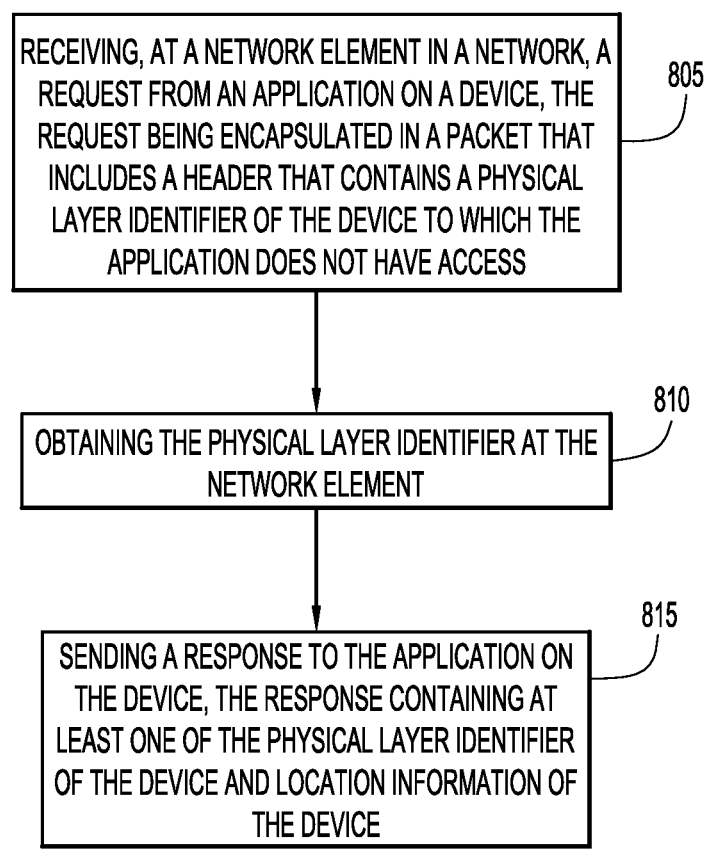
FIG. 8 is a flow chart depicting operations performed by a network element according to techniques presented herein.

FIG. 8 is a flow chart providing a method summarizing operations performed by a network element according to the techniques presented above in connection with FIGS. 1-7. At 805, a request is received at a network element from an application on a device. The request is encapsulated in a packet that includes a header that contains a physical layer identifier of the device to which the application does not have access. The physical layer identifier is obtained at the network element at 810. There are numerous methods presented above in connection with FIGS. 1-7 for obtaining the physical layer identifier and for using the physical layer identifier to determine the location information of the device, some of which may involve further user device involvement (e.g., FIGS. 4 and 5), and others that involve operations of network elements to obtain the location information on behalf of the user device, and return the location information to the user device (e.g., FIGS. 6 and 7). At 815, a response is sent to the application on the device, the response containing at least one of the physical layer identifier of the device and location information of the device. Thus, when the response at 815 includes the physical layer identifier of the device, then the device can obtain the location information itself, as depicted in FIG. 4. Or, the response may include the location information obtained through any of the techniques depicted in FIGS. 5-7 and described above.

Figure 9:
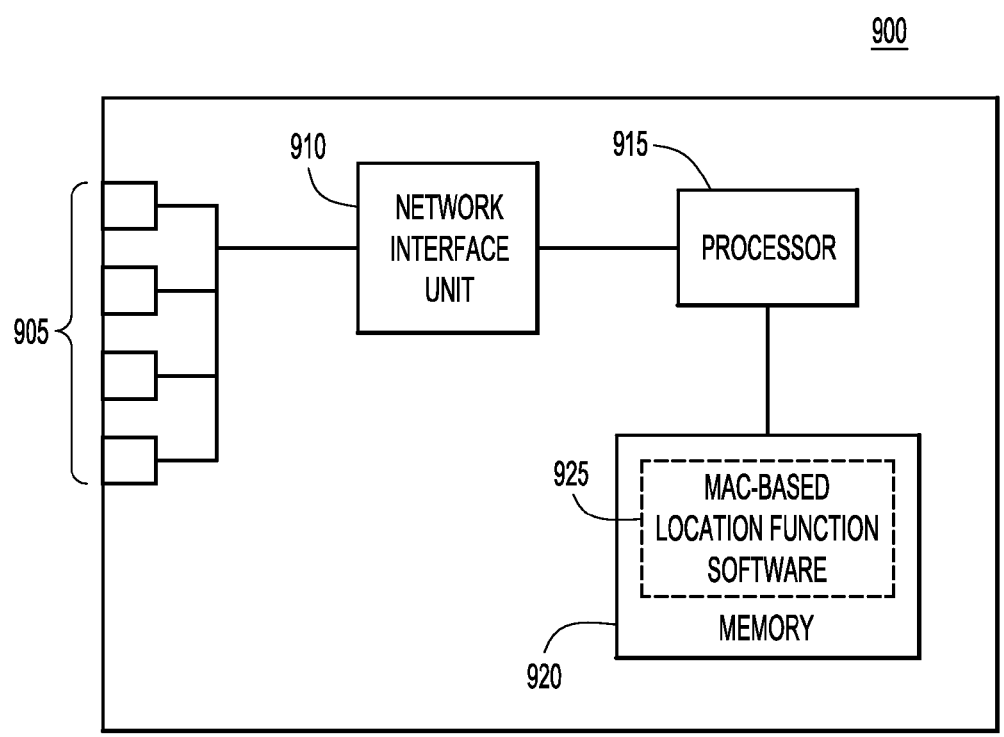
FIG. 9 is an example of a block diagram of a device configured to perform the operations described above in connection with FIGS. 1-8.

FIG. 9 shows a simplified block diagram of a network element 900, which may be a proxy 125, a controller 130, or an access point 135, for example, that is configured to perform the operations presented herein. Network communications from may be sent through and received via ports 905. A network interface unit 910 (e.g., a network interface card) is connected to the ports 905, and enables network communications so that the network element 900 may communicate with a user device or other network elements. The network element 900 includes a processor 915 that may take the form of a microprocessor or microcontroller that executes instructions stored in main memory 920. Main memory 920 stores instructions for MAC-based location function software 925, which when executed by processor 915, causes the network element 900 to perform the operations described herein in connection with FIGS. 1-8 as part of the various procedures presented herein.

The memory 920 may comprise read only memory (ROM), random access memory (RAM) that stores software (and data) 925, magnetic disk storage media devices 812, optical storage media devices, flash memory devices, electrical, optical, or other physical/tangible memory storage devices, such as removable storage-related devices and software. Thus, in general, the memory 920 may comprise one or more tangible (non-transitory) computer readable storage media (e.g., a memory device) encoded with software comprising computer executable instructions and when the software is executed (by the processor 915) it is operable to perform the operations described herein.

There are many applications to the techniques presented herein. For example, event venue operators want to offer local services to users of Smartphones, and these services typically depend on being able to locate the Smartphone within the venue. A significant problem is that web-based clients (unlike downloaded apps) do not have access to the device MAC address, or the device location. This is because the code that runs in the web browser context is untrusted and restricted from making calls to the operating system running on the Smartphone.

As presented above, in one example, the MAC address or current location is provided to a web-based mobile client application as a cookie that is inserted by an HTTP proxy. In the case that the cookie contains the MAC address, the client then uses the MAC address cookie for querying an entity having access to location information of the device, or an entity capable of initiating a location process to obtain the location of the device. In the case that the cookie contains the current location, this can be used immediately by the client application.

In another method, the device makes a Layer 4 "Where Am I?" request to a special proxy IP address on a wireless network controller, which obtains the MAC address from the packet, queries the MSE, and responds with the device location. This method can be used with both web applications and native applications. With some operating systems, even native applications will not be able to query the operating system for the device MAC.

Again, these techniques enable location of web-based mobile clients, which is useful for many in-venue apps such as indoor way-finding, coupons, etc. There is a growing trend towards use of web-based applications over downloaded applications, because web-based applications are platform independent and run on all types of user devices.

In summary, a method is provided comprising receiving, at a network element in a network, a request from an application on a device, the request being encapsulated in a packet that includes a header that contains a physical layer identifier of the device to which the application does not have access, obtaining the physical layer identifier at the network element, and sending a response to the application on the device, the response containing at least one of the physical layer identifier of the device and location information of the device.

Further, an apparatus is provided comprising a network interface unit configured to enable communications over a network, a processor coupled to the network interface unit, and configured to receive a request from an application on a device, the request being encapsulated in a packet that includes a header that contains a physical layer identifier of the device to which the application does not have access, obtain the physical layer identifier of the device, and send a response to the application on the device, the response containing at least one of the physical layer identifier of the device and location information of the device.

Further still, a computer readable storage media is encoded with software comprising computer executable instructions and when the software is executed operable to receive a request from an application on a device, the request being encapsulated in a packet that includes a header that contains a physical layer identifier of the device to which the application does not have access, obtain the physical layer identifier at the network element, and send a response to the application on the device, the response containing at least one of the physical layer identifier of the device and location information of the device.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:
1. A method comprising:
receiving, at a network element in a network, a request for web content from an application on a device, the request being encapsulated in a packet that includes a header that contains a physical layer identifier of the device to which the application does not have access;

obtaining the physical layer identifier at the network element;

querying an entity having access to location information for devices operating in the network using the physical layer identifier to obtain location information of the device;

injecting a cookie including the location information, as geographic coordinates, into the web content to be sent to the application as a response to the request; and sending the response to the application on the device, the response containing the injected cookie that includes the location information indicating a current location of the device in the network.

2. The method of claim 1, wherein receiving comprises receiving the request made to a predetermined address configured to allow the application to obtain location information of the device in the network, wherein the predetermined address is provided to the application by a controller or an access point, and querying further comprises:

redirecting the request received at the predetermined address to the entity.

3. The method of claim 1, wherein the entity is a first entity, the header contains an Internet Protocol (IP) address of the device, and wherein obtaining the physical layer identifier of the device comprises:

obtaining the IP address from the packet; and querying a second entity using the IP address to obtain the physical layer identifier of the device.

4. The method of claim 1, wherein the entity is a controller or location server and the geographic coordinates comprise X, Y, Z coordinates or latitude and longitude.

5. The method of claim 1, wherein the request is a first request and the method further comprises:

updating the physical layer identifier each time the application is accessing location-based functionality.

6. An apparatus comprising:

a network interface unit configured to enable communications over a network;

a processor coupled to the network interface unit, and configured to:

receive a request for web content from an application on a device, the request being encapsulated in a packet that includes a header that contains a physical layer identifier of the device to which the application does not have access;

obtain the physical layer identifier;

query an entity having access to location information for devices operating in the network using the physical layer identifier to obtain location information of the device;

inject a cookie including the location information, as geographic coordinates, into the web content to be sent to the application as a response to the request; and send the response to the application on the device, the response containing the injected cookie that includes the location information indicating a current location of the device in the network.

7. The apparatus of claim 6, wherein the request is made to a predetermined address configured to allow the application to obtain location information of the device in the network, wherein the predetermined address is provided to the application by a controller or an access point and, in querying the entity, the processor is configured to:

redirect the request received at the predetermined address to the entity.

8. The apparatus of claim 6, wherein the entity is a first entity, the header contains an Internet Protocol (IP) address of the device, and in obtaining the physical layer identifier of the device comprises, the processor is further configured to:

obtain the IP address from the packet; and query a second entity using the IP address to obtain the physical layer identifier of the device.

9. The apparatus of claim 6, wherein the entity is a controller or location server and the geographic coordinates comprise X, Y, Z coordinates or latitude and longitude.

10. The apparatus of claim 6, wherein the request is a first request and the processor is further configured to:

update the physical layer identifier each time the application is accessing location-based functionality.

11. One or more non-transitory computer readable storage media encoded with software comprising computer executable instructions and when the software is executed operable to:

receive a request for web content from an application on a device, the request being encapsulated in a packet that includes a header that contains a physical layer identifier of the device to which the application does not have access;

obtain the physical layer identifier;

query an entity having access to location information for devices operating in the network using the physical layer identifier to obtain location information of the device;

inject a cookie including the location information, as geographic coordinates, into the web content to be sent to the application as a response to the request; and send the response to the application on the device, the response containing the injected cookie that includes the location information indicating a current location of the device in the network.

12. The one or more non-transitory computer readable storage media of claim 11, wherein the request is made to a predetermined address configured to allow the application to obtain location information of the device in the network, wherein the predetermined address is provided to the application by a controller or an access point, and the instructions operable to query the entity further comprise instructions operable to:

redirect the request received at the predetermined address to the entity.

13. The one or more non-transitory computer readable storage media of claim 11, wherein the entity is a first entity, the header contains an Internet Protocol (IP) address of the device, and the instructions operable to obtain the physical layer identifier of the device further comprise instructions operable to:

obtain the IP address from the packet; and query a second entity using the IP address to obtain the physical layer identifier of the device.

14. The computer readable storage media of claim 11, wherein the entity is a controller or location server and the geographic coordinates comprise X, Y, Z coordinates or latitude and longitude.

15. The one or more non-transitory computer readable storage media of claim 11, further comprising instructions operable to:

update the physical layer identifier each time the application is accessing location-based functionality.

* * * * *